United States Patent [19]

Hirakami

[11] Patent Number: 5,322,338
[45] Date of Patent: Jun. 21, 1994

[54] DOOR STRUCTURE OF AN AUTOMOTIVE VEHICLE

[75] Inventor: Kiyomi Hirakami, Hiroshima, Japan

[73] Assignee: Mazda Motor Corporation, Hiroshima, Japan

[21] Appl. No.: 967,640

[22] Filed: Oct. 29, 1992

[30] Foreign Application Priority Data

Oct. 29, 1991 [JP] Japan .................. 3-283021

[51] Int. Cl.⁵ .............................. B60J 5/04
[52] U.S. Cl. ..................... 296/151; 296/146.5; 296/146.9; 296/188
[58] Field of Search ............... 296/146.1, 146.5, 146.6, 296/146.9, 151, 188, 198, 195, 202, 203

[56] References Cited

U.S. PATENT DOCUMENTS 5,066,064 11/1991 Garnweidner .................. 296/189 X

FOREIGN PATENT DOCUMENTS 767494 9/1952 Fed. Rep. of Germany ...... 296/198
619656 3/1949 United Kingdom ................ 296/198

Primary Examiner—Dennis H. Pedder
Attorney, Agent, or Firm—Keck, Mahin & Cate

[57] ABSTRACT

A vehicle door opens and closes a door opening which is defined between a pillar and a fender formed with a wheel arch. The vehicle door and disposed adjacent to the wheel arch has a door extension extending to the wheel arch and shaped so as to conceal part of the fender between the door opening and the wheel arch.

4 Claims, 4 Drawing Sheets

DOOR STRUCTURE OF AN AUTOMOTIVE VEHICLE

BACKGROUND OF THE INVENTION

1. Field of the Invention

The present invention relates to a door structure for an automobile vehicle and, more particularly, to a structure of a door which opens and closes a door opening of an automotive vehicle body disposed near a wheel arch of the vehicle body.

2. Description of Related Art

Typically, a rear door of a vehicle is disposed near a wheel arch. For example, as shown in FIGS. 1 and 2, a circular-arcuate wheel arch "b", which is integral with a rear fender, defines and forms a wheel space for a rear wheel. A lower rear corner portion of a door opening is defined by an arcuate portion "c" of the rear fender extending between the circular-arcuate wheel arch "b" and the door opening. The rear door "a" is shaped so as to entirely meet the door opening and be flush with the rear fender, including the arcuate fender portion "c", when the rear door "a" is closed. Such a vehicle door structure is known from, for instance, Japanese Unexamined Utility Model Publication No. 3-17,984.

From the standpoint of vehicle body design, separation lines appearing on the exterior of a vehicle body, for instance, between a door and a fender, make the exterior of the vehicle body appear unattractive. The vehicle body having the prior art door structure includes two separation lines, such as an arcuate peripheral edge "d" of the rear door "a" and an arcuate peripheral edge "e" of the arcuate portion "c" of the rear fender. These separation lines make the exterior of the vehicle body appear unattractive. Because the arcuate peripheral edge "d" of the rear door "a" is defined by a small extension "g" of the rear door "a" formed so as to presses a weather strip "f" against the rear fender, if an external impact is applied to the rear door "a", the small extension "g" does not effectively prevent deformation of the door.

SUMMARY OF THE INVENTION

It is an object of the present invention to provide a door structure for a vehicle body which provides an attractive exterior body appearance.

It is another object of the present invention to provide a door structure for a vehicle body which has a high resistivity against deformation.

The foregoing objects are achieved by providing a door structure for an automotive vehicle body having a pillar and a fender between which a door opening is formed adjacent to a wheel arch for surrounding a wheel. A door, hinged to the pillar so as to open and close the door opening, is formed with an arcuate door extension extending to the circular-arcuate wheel arch so as to conceal an arcuate portion of the fender between the door opening and the circular-arcuate wheel arch. The circular-arcuate wheel arch is formed with a wheel arch flange extending inwardly in a transverse direction of the vehicle body, and the door extension is formed with a door extension flange bent inwardly in the transverse direction so as to cover the wheel arch flange.

The arcuate door extension of the door overlaps and conceals the arcuate part of the fender, so that no separation line is visible from the outside. Furthermore, since the door is supported by the fender through the arcuate door extension when it is closed, the door is highly resistive against an external impact applied to the door.

BRIEF DESCRIPTION OF THE DRAWINGS

The foregoing and other objects and features of the present invention will be understood more clearly and fully from the following detailed description of the preferred embodiments thereof when considered in conjunction with the accompanying drawings, in which the same reference numbers have been used to designate similar or the same elements throughout, and in which.

DETAILED DESCRIPTION OF THE PREFERRED EMBODIMENTS

Because rear body structures are well known, the present description will be directed, in particular, to elements forming part of, or cooperating with, the novel structure of a rear door in accordance with the present invention. It is to be understood that elements not specifically shown or described can take various forms well known to those skilled in the art.

Figure 1:
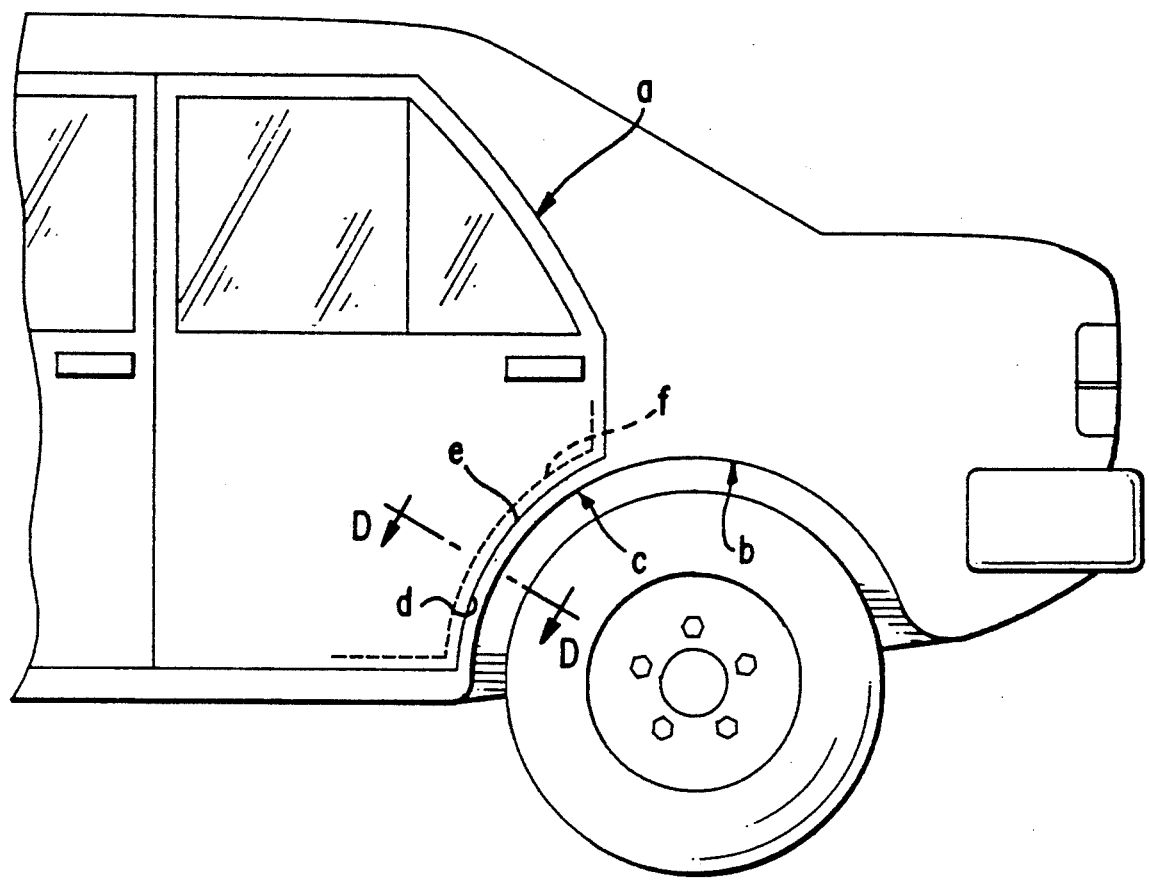
FIG. 1, as noted above, is a schematic side view showing the rear section of a prior art car body.
Figure 2:
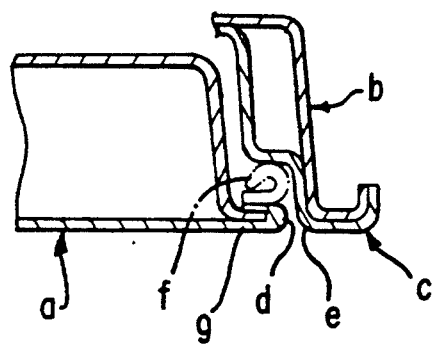
FIG. 2 is a cross-sectional view of FIG. 1.
Figure 3:
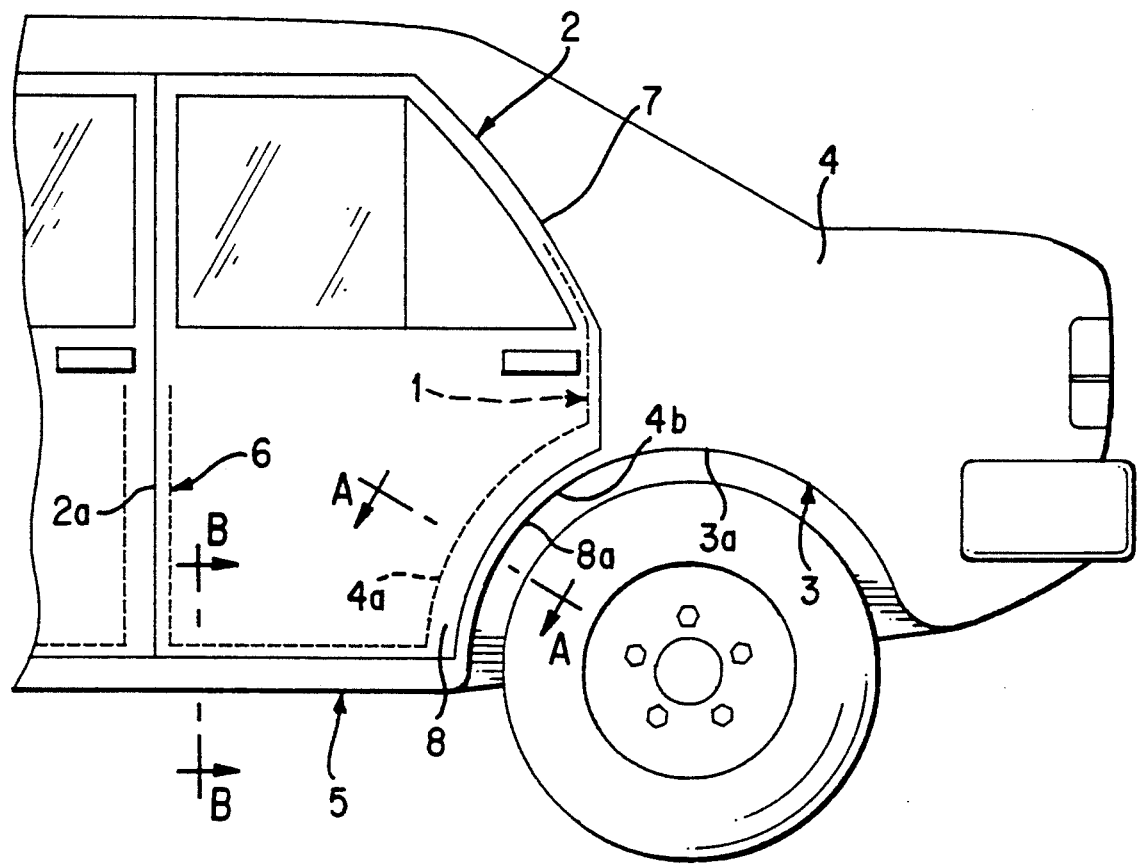
FIG. 3 is a schematic side view showing the rear section of a car body in accordance with a preferred embodiment of the present invention.
Figure 4:
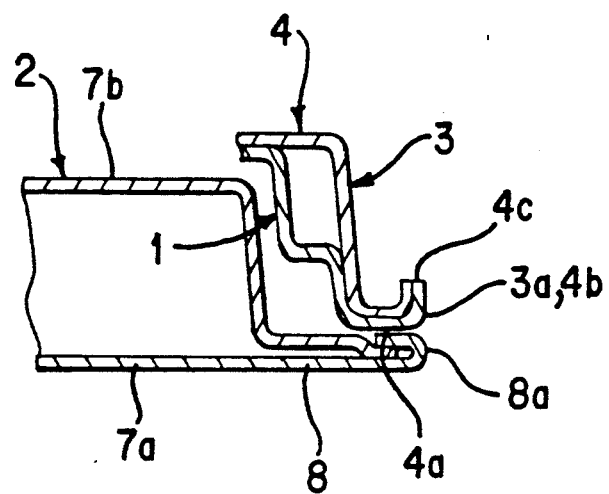
FIG. 4 is a cross-sectional view of FIG. 3 along line A—A.
Figure 5:
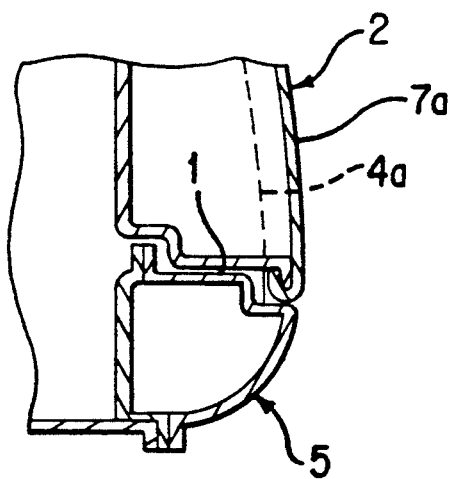
FIG. 5 is a cross-sectional view of FIG. 3 along line B—B.

Referring to the drawings in detail and, in particular, to FIGS. 3 to 5, part of a rear car body in accordance with a preferred embodiment of the present invention is shown. The rear car body is formed therein with a rear door opening 1 which is opened and closed by a rear door 2. The rear door opening 1 is shaped so that it has a generally rectangular configuration and has a lower rear corner portion which is arcuately curved so as to meet a circular-arcuate wheel arch 3 defining and forming a wheel space for a rear wheel. The rear door 2 is integrally formed with a lower rear arcuately curved corner so as to match the shape of the rear door opening 1. The circular-arcuate wheel arch 3 is formed as an integral portion of a rear fender 4. The door opening 1 is defined by the rear fender 4, a side sill 5 and a center pillar 6. An arcuate portion 4a of the rear fender 4, which is disposed along and between the front portion of the circular-arcuate wheel arch 3 and the lower rear arcuately curved corner of the door opening 1, is unevenly indented inwardly from both the major portion of the rear fender 4 and the side sill 5 in a transverse direction of the car body (see FIG. 5). A peripheral edge 4b of the arcuate portion 4a of the rear fender 4 forms part of a peripheral edge 3a of the wheel arch 3 and is formed with an inwardly bent flange 4c.

The rear door 2 is hinged to the center pillar 6 along its front end 2a so as to swing. The rear door 2 comprises an inner door panel 7a and an outer door panel 7b. The inner door panel 7a is configured so as to entirely meet the door opening 1. However, the outer door panel 7b is formed with a lower rear arcuately curved extension, namely, an arcuate door extension 8, so as to conceal the arcuate portion 4a of the rear fender 4. Although there is an uneven outer surface between the rear fender 4 and the side sill 5 when the rear door 2 is opened, the arcuate door extension 8 forms even outer surfaces between the rear door 2, the rear fender 4 and the side sill 5 when the rear door 2 is closed.

When the rear door 2 is closed, the arcuate portion 4a of the rear fender 4 is concealed by the arcuate door extension 8 of the outer door panel 7b. The outer peripheral edge 8a of the arcuate door extension 8 of the outer door panel 7b meets the peripheral edge 3a of the wheel arch 3. Consequently, there is no separation line such as that which is conventionally visible between the rear lower portion of the rear door "a" and the rear fender "c". This provides the car body with an attractive exterior body appearance of.

If an external impact is applied to the rear door 2 from the exterior of the car body toward the interior of the car body (from the upper portion to the lower portion as viewed in FIG. 4) upon a collision, the arcuate door extension 8 of the outer door panel 7b is brought into contact with the arcuate portion 4a of the rear fender 4. The extension 8 is prevented by the arcuate portion 4a of the rear fender 4 from deforming toward the interior of the car body. The overlapping area of the arcuate door extension 8 of the outer door panel 7b on the arcuate portion 4a of the rear fender 4 is larger than an overlapping area "g" between the rear door "a" and the arcuate wheel arch member "b" of the prior art rear door structure. Consequently, the rear door structure of the present invention provides a resistivity of the rear door 2 against deformation which is larger than that of the prior art rear door structure.

Figure 6:
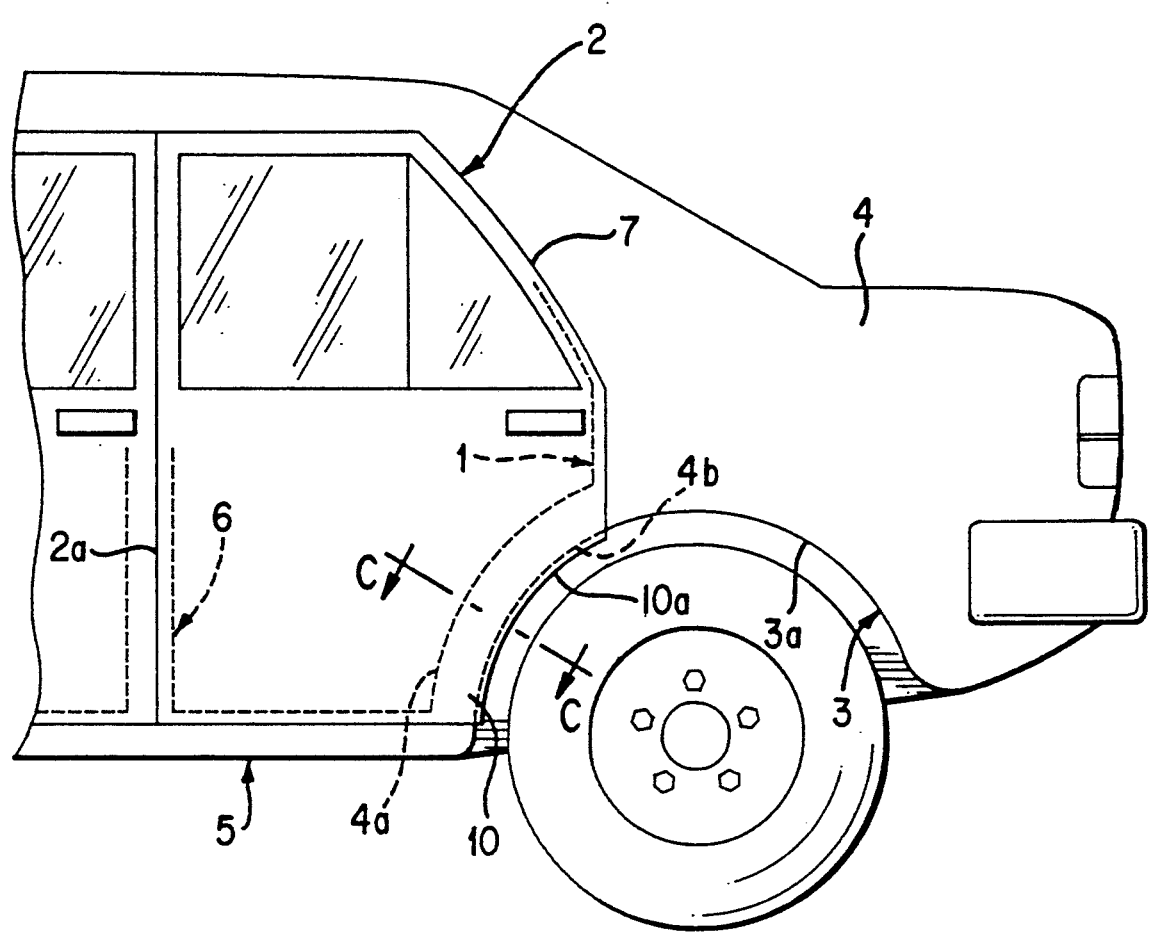
FIG. 6 is schematic side view showing the rear section of a car body in accordance with another preferred embodiment of the present invention.
Figure 7:
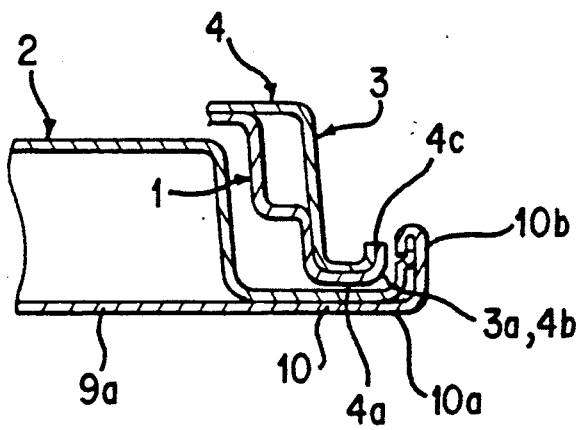
FIG. 7 is a cross-sectional view of FIG. 6 along line C—C.

FIGS. 6 and 7 show part of a rear car body in accordance with another preferred embodiment of the present invention. A rear door 2 is hinged to the center pillar 6 along its front end 2a so as to swing. The rear door 2 comprises an inner door panel 9a and an outer door panel 9b. The inner door panel 9a is configured so as to entirely meet the door opening 1. However, the outer door panel 9b is integrally formed with an arcuate door extension 10. The arcuate door extension 10 comprises a flat portion 10a, shaped so as to cover up an arcuate portion 4a of a rear fender 4, and a bent portion or door extension flange 10b, bent inwardly in the transverse direction from the flat portion 10a so as to conceal part of the inwardly bent flange 4c of the circular-arcuate wheel arch 3. When the rear door 2 is closed, the rear door 2, the rear fender 4 and the side sill 5 form a continuous even outer surface of the rear body. Further, when the rear door 2 is closed, the door extension flange 10b of the arcuate door extension 10 of the rear door 2, as viewed outside of the car body, seems to be expanded toward the rear wheel from the arcuate portion 4a of a rear fender 4, which forms part of an peripheral edge 3a of the circular-arcuate wheel arch 3.

In the rear door structure described above, the arcuate portion 4a of a rear fender 4 is concealed by the arcuate door extension 10 of the rear door 2. As a result, there is no separation line visible between the rear lower portion of the rear door and the arcuate portion 4a of a rear fender 4.

If an impact is applied to the rear door 2 from the exterior of the car body toward the interior of the car body (from the upper portion to the lower portion as viewed in FIG. 7) upon a collision, the flat portion 10a of the arcuate door extension 10 of the outer door panel 9b is brought into contact with the arcuate portion 4a of the rear fender 4, so as to be prevented, by the arcuate portion 4a of the rear fender 4, from deforming toward the interior of the car body. Accordingly, in the same manner as described in connection with the previous embodiment, the rear door structure of this embodiment provides the resistivity of a rear door 2 against deformation which is larger than that of the prior art rear door structure. Furthermore, since the bent portion 10b of the arcuate door extension 10 of the rear door 2 is brought into contact with and conceals the inwardly bent flange 4c of the arcuate portion 4a of the rear fender 4 upon a collision, the rear door structure of this embodiment provides a resistivity of the rear door 2 against deformation which is larger than that of the door structure of the previous embodiment, in which the arcuate door extension 10 of the rear door 2 simply overlaps the arcuate portion 4a of the rear fender 4.

The rear door structure may be modified so that the rear fender 4 is integrally formed with an arcuate portion unevenly projecting laterally outward therefrom. For such a rear fender, the arcuate door extension 10, which is integral with the outer door panel 7b or 9b, is unevenly projected laterally outward from the outer door panel 7a or 9b. Such a modified rear door structure also has no visible separation line appearing between the rear door and the rear fender and provides an increased resistivity of the rear door 2 against deformation.

Although, in the above embodiments, the door structure of the present invention is applied to a rear door, it may also be applied to a front door for a vehicle, such as a cab-over type vehicle and a one-box car, in which a front door is provided adjacent to an upper portion or a front portion of a front wheel arch.

It is to be understood that although the present invention has been described with respect to preferred embodiments thereof, various other embodiments and variants may occur to those skilled in the art. Such other embodiments and variants falling within the scope and spirit of the invention are intended to be covered by the following claims.

What is claimed is:

1. A door structure for an automotive vehicle body in which a door is disposed adjacent to a wheel arch, said door structure comprising:

a pillar and a fender between which a door opening is formed, said fender being formed with a wheel arch, having a peripheral edge, surrounding a wheel; and a door hinged to said pillar so as to open and close said door opening, said door being formed with a door extension extending to a position which is approximately aligned with said peripheral edge of said wheel arch so as to conceal part of said fender between said door extension and said wheel arch;

wherein said wheel arch is formed with a wheel arch flange extending inwardly in a transverse direction of said automotive vehicle body, and wherein said door extension is formed with a door extension flange bent inwardly in said transverse direction so as to cover said wheel arch flange.

2. A door structure as defined in claim 1, wherein said door comprises an inner door panel, shaped so as to match a shape of said door opening, and an outer door panel integrally formed with said door extension.

3. A door structure as defined in claim 2, wherein said part of said fender between said door extension and said wheel arch is indented inwardly in said transverse direction.

4. A door structure as defined in claim 3, wherein said door extension is substantially aligned with said outer door panel.

* * * * *